United States Patent
Johnson et al.

(10) Patent No.: US 7,735,122 B1
(45) Date of Patent: Jun. 8, 2010

(54) CREDENTIAL MAPPING

(75) Inventors: David Nephi Johnson, Provo, UT (US); Dustin Lance Nielson, Salt Lake City, UT (US); Jerry E. Griffis, Jr., Lehi, UT (US); David Kent Beus, Highland, UT (US); Nathan Blaine Jensen, Spanish Fork, UT (US); William Street, Orem, UT (US); Paul Erik Sherman, Lehi, UT (US); Michael William Cook, Orem, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1154 days.

(21) Appl. No.: 10/652,710

(22) Filed: Aug. 29, 2003

(51) Int. Cl.
 *H04L 29/00* (2006.01)
(52) U.S. Cl. ............................ 726/6; 726/7; 705/74
(58) Field of Classification Search ................ 726/6, 726/19, 18, 8, 5, 7; 705/51; 713/153
See application file for complete search history.

(56) References Cited

U.S. PATENT DOCUMENTS

| | | | |
|---|---|---|---|
| 5,586,260 A | 12/1996 | Hu | 395/200.2 |
| 5,604,904 A | 2/1997 | Kini | 395/682 |
| 5,815,665 A * | 9/1998 | Teper et al. | 709/229 |
| 5,958,050 A | 9/1999 | Griffin et al. | 713/200 |
| 5,961,593 A * | 10/1999 | Gabber et al. | 709/219 |
| 6,067,623 A | 5/2000 | Blakley et al. | 713/201 |
| 6,088,451 A * | 7/2000 | He et al. | 726/8 |
| 6,438,600 B1 | 8/2002 | Greenfield et al. | 709/229 |
| 6,463,533 B1 * | 10/2002 | Calamera et al. | 713/163 |
| 6,609,198 B1 * | 8/2003 | Wood et al. | 713/155 |
| 6,937,976 B2 * | 8/2005 | Apte | 1/1 |
| 7,010,690 B1 * | 3/2006 | Hanna et al. | 713/170 |
| 7,203,315 B1 * | 4/2007 | Livesay | 380/255 |
| 7,412,422 B2 * | 8/2008 | Shiloh | 705/74 |
| 2001/0029496 A1 * | 10/2001 | Otto et al. | 705/74 |
| 2001/0044787 A1 * | 11/2001 | Shwartz et al. | 705/78 |
| 2003/0069857 A1 * | 4/2003 | Junda | 705/74 |
| 2006/0247982 A1 * | 11/2006 | Stolfo et al. | 705/26 |

* cited by examiner

*Primary Examiner*—Minh Dinh
(74) *Attorney, Agent, or Firm*—Schwegman, Lundberg & Woessner, P.A.

(57) ABSTRACT

Methods, systems, and data structures map credentials. A master credential is established for a user or an application. The master credential is mapped to one or more service credentials associated with one or more services. When a request for a service is received from a requestor, the request is authenticated using the master credential. If the master credential is authenticated, then an appropriate service credential associated with the appropriate requested service is acquired and sent directly (via proxy) to the service on behalf of the requestor.

12 Claims, 3 Drawing Sheets

CREDENTIAL MAPPING

FIELD OF THE INVENTION

The present invention relates to credential management, and in particular to mapping a master credential to one or more service credentials on behalf of a request for one or more services.

BACKGROUND OF THE INVENTION

Organizations are frequently establishing short-term or long-term electronic relationships (collaborations) with one another over the Internet using the World-Wide Web (WWW). These electronic relationships often entail providing electronic access to services of the organizations. However access needs to be provided using secure and easily managed techniques.

Correspondingly, electronic identifications and passwords are created for providing credentialing information to collaborating services. These credentials are used to authenticate users and applications accessing the collaborating services. Credentials can include user or application identifiers, passwords, digital signatures, digital certificates, and the like.

Conventionally, one problem for an organization that desires to electronically collaborate with services of another organization is that the organization may unwittingly expose internal credentials to the collaborating service. This occurs because the credentials provided to the desired service may and in many cases will be the credentials associated with an organization's internal systems or services. Thus, by sending these credentials to the collaborating service, a malicious user could potentially gain access to vital systems or services of the organization.

Another problem with individually providing credentials to each desired service for which an organization is collaborating, is that if many users of the organization are provided access to the service, then management of all the different and disparate credentials becomes a maintenance nightmare. Moreover, this problem is exponentially compounded when an organization collaborates with many external services associated with a plurality of organizations.

Collaborating in a secure manner can also occur within departments of a single organization, where the departments are electronically collaborating with one another. Thus, the secure collaboration problems discussed herein occur not just between organizations but also between departments of the same organization.

Therefore, there exists a need for improved techniques that more securely provide and manage credentials.

SUMMARY OF THE INVENTION

In various embodiments of this invention, novel techniques for managing and mapping (e.g., federating) credentials are taught. A master credential is established for a unique user or application (requestor). The master credential is then mapped to one or more service credentials for one or more services. When a request for a service is received with the master credential, the master credential is authenticated. If the master credential is properly authenticated, then an appropriate service credential for the requested services is obtained using the mapping and provided to the service on behalf of the requestor.

More specifically and in one embodiment of the invention, a method for mapping credentials is described. Initially, a master credential is created and a service credential for a service is generated. Next, a mapping is generated from the master credential to the service credential.

In another embodiment of the present invention, another method for mapping credentials is presented. A master credential is received with a request to access a service. The master credential is authenticated and then mapped to a service credential. Next, the service credential is provided to the service, if the master credential is authenticated.

In still another embodiment of the present invention, a credential mapping system is discussed. The credential mapping system includes a credential authentication service and a credential data store. The credential authentication service accesses the credential data store to authenticate master credentials associated with requests for a service and maps any authenticated master credentials into a service credential. The service credential is needed by the service before the requests are addressed by the service.

In yet another embodiment of the present invention, a credential mapping data structure residing in a computer-readable medium is presented. The credential mapping data structure includes a master credential identifier and a service identifier. The master credential identifier and the service identifier combine to form a mapping from a master credential to a service credential.

BRIEF DESCRIPTION OF THE DRAWINGS is a flowchart representing a method for mapping credentials;

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of this invention. The following description is, therefore, not to be taken in a limited sense, and the scope of the invention is defined by the appended claims.

As used herein a "credential" is electronic information that is consumed by an electronic system or service in order to authenticate a requestor for that service. A credential can include more than one piece of electronic information. For example, a typical credential includes a requestor identifier and a password. In other embodiments, a credential can include other electronic information such as digital certificates, digital signatures, and the like.

The terms "system" and "service" are used interchangeably and synonymously herein. These terms refer to software applications accessible over a network. The services described in this disclosure use credentials to authenticate requestors (e.g., users or applications) before access to those services is provided. Some services can be disparate from other services (e.g., heterogeneous). Conversely, some services can be compatible with other services. Services can be remote from one another, external to one another, or internal within the same logical network to one another. Services can also be trusted or not trusted.

In one embodiment, existing software services (products) are modified to achieve the teachings of this invention. For example, the iChain and DirXML products distributed by Novell, Inc. of Provo, Utah can be modified for mapping or federating credentials between other services within a network. Of course, other products or newly developed products can be modified or created to achieve the teachings of this invention. All such modified or created products are intended to fall within the scope of this invention.

Figure 1:
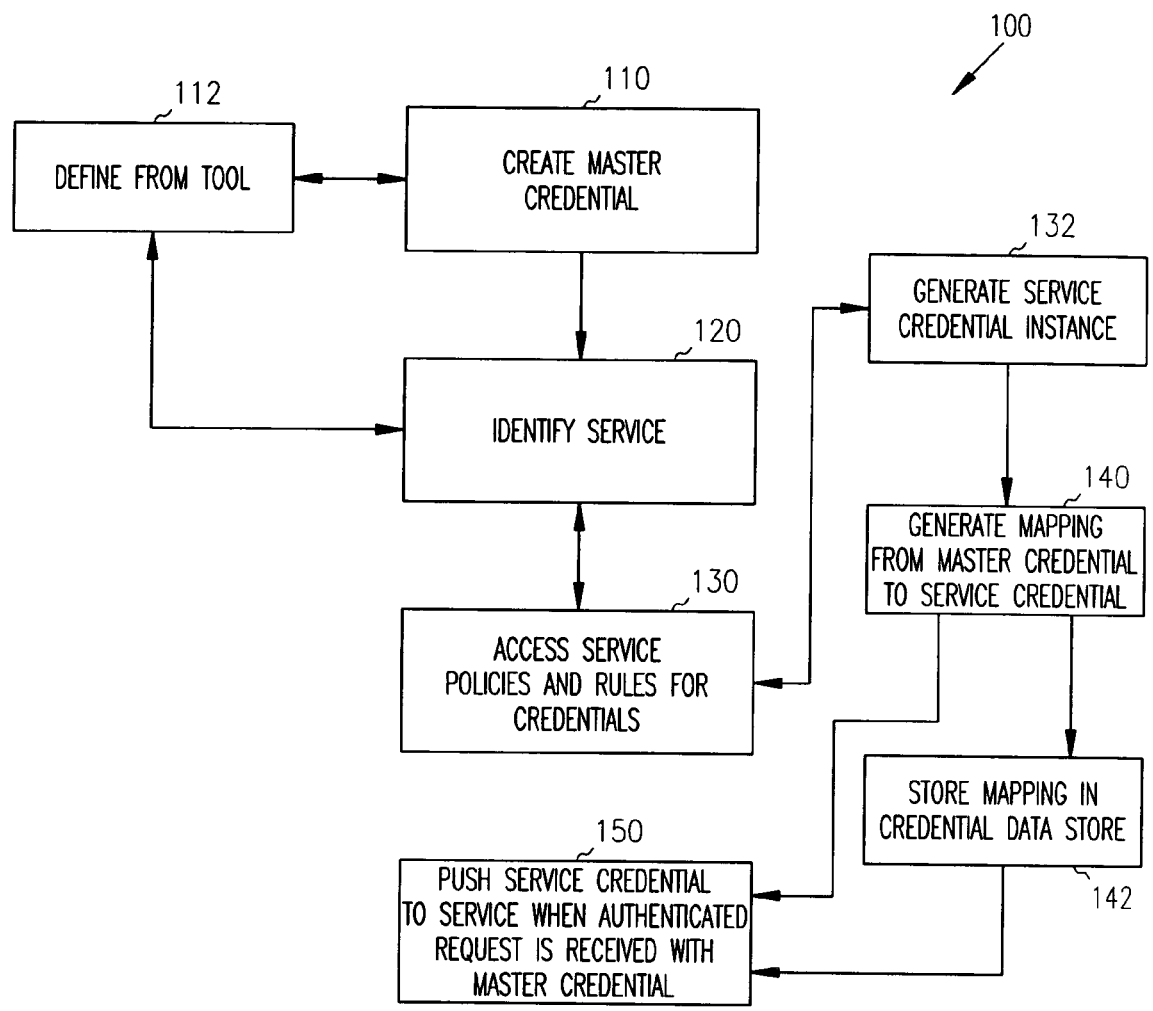

FIG. 1 is a flowchart of a method 100 for mapping credentials. The method 100 is implemented in a computer readable medium as one or more software applications. In one embodiment, the method 100 is implemented as an identity proxy service that intercepts requests for other services on behalf of a requestor.

Initially, at 110, a master credential is created by the service embodying the processing of the method 100. A maser credential includes a requestor's unique identifier and some additional information (e.g., password, digital certificate, digital signature, and the like). The master credentials are used for uniquely identifying and authenticating requestors and mapping (e.g., federating) the master credentials to one or more service credentials for services that the requestors desire to access.

Any Application Programming Interface (API) or tool can be used to initially create the master credential for a requestor. As an example, and in one embodiment, World-Wide Web (WWW) browser pages and applets can directly interact with a requestor via a browser for receiving master credentialing information (e.g., requester identifier and password) from that requestor. Correspondingly, at 112, the master credential can be defined from any tool or interface.

The tool at 112 can also be used by a requestor or a network administrator for identifying a service or plurality of services for which a requestor desires access, as depicted at 120. Alternatively, in another embodiment, the identity of a service(s) for which a requestor is to be permitted access can be predefined and acquired from a data store of file based on the requestor's unique identifier included in the master credential. In this way, administrators can set the services for which requestors are to have access. Moreover, the tool, at 112, need not be a single tool but can be a plurality of tools some of which can be accessed by a requestor and some of which are reserved for an administrator.

Once a master credential is established for a requestor and the service identified, an appropriate service credential can be generated and mapped to the master credential. The service credential can be syntactically and semantically restricted by the service. For example, one service may require an identifier that is in the form of an electronic mail (e-mail) address. Another common circumstance is where a password portion of a service credential is required to be of a certain string length or include at least one numeric character. These required syntaxes and semantics can be defined by access service policies and rules for each of the services.

Moreover, in some embodiments, the access service policies and rules do not need to be only associated with substantive credentialing information. For example, some access service policies can relate to password hints and answers that can be used to acquire a password.

At 130, the desired service's access service policies (credentialing policies) and rules are accessed after the master credential is created for a requestor. Next, at 132, the service that embodies the processing of the method 100 interacts with the identified service using the restrictions of the service's access service policies and rules in order to generate a service credential instance for the master credential. The generated service credential is associated with the master credential. This association forms a mapping between the master credential and the service credential. Accordingly, the mapping is generated at 140.

The mapping can be stored in a single credentialing data store at 142, a plurality of different data stores, or alternatively the mapping can be logically assembled when needed. For example, a single credentialing data store can be indexed on a portion of the master credential and an identifier for the service such that when a requestor issues a request for the service, the requestor's master credential is authenticated and the requestor's unique identifier and the service identifier are searched for in the credentialing data store. The result of that search returns the service credential. That service credential is then pushed at 150 to the appropriate service on behalf of the requestor. In other embodiments, the service can itself pull the service credential from the processing of the method 100 when needed.

The identifier for the service is included with the initial request sent by a requestor. For example, when a requestor accesses a WWW browser link for a service, that service is identified in the Uniform Resource Locator (URL) data structure that represents that browser link. Typically, this is an Internet Protocol (IP) address and is unique to the service being requested. This URL is intercepted by the processing of the method 100. The URL can also include the requestor's master credentials.

Alternatively, subsequent interactions after the request is received by the processing of the method 100 can occur such that when the request is intercepted, the requestor is provided a Graphical User Interface (GUI) dialogue box for providing the needed master credential. In still other embodiments, the requestor unknowingly and automatically provides the master credential through the use of browser cookies with the request for the service. In still more embodiments, the master credential is only required of the requestor once per login session or is automatically obtained by the processing of the method 100 from the requestor's computing environment when requests are received.

Once a requestor is authenticated for a service request, portions of the master credential and the service identifier are used to generate the proper mapping for the needed service credential. As was described above, that mapping can be indexed in a single credentialing data store or indexed in a plurality of data stores and logically assembled when needed.

Additionally, the initially generated service credential can also be randomly generated for the requestor or generated in a manner that can be dynamically reconstituted when needed, such that the mapping does not require storage at all. For example, suppose a requestor's identification is "Bill_Street" and a requestor's password is "Novell." The identification and password are used to generate a master credential for the processing of the method 100. The requestor in this example is an end user identified as "Bill Street." Suppose further that Bill wants to access a legacy WWW service for Linux. At initialization, 110-112, Bill interacts with the processing of the method 100 to provide his master credentialing information "Bill_Street and Novell" and to identify the service Linux, at 120.

Continuing with the present example, the needed Linux access service policies and rules are obtained for the Linux service at 130. Next, a reproducible service credential is generated by interacting with the Linux service at 132. Suppose, this reproducible service credential is obtained by making Bill's Linux service's user identification an integer number and Bill's Linux service's password his master credential password combined in some reproducible fashion with his Linux service's user identification. For example, suppose Bill's Linux service's user identification is generated to be 1111 (e.g., based on an internally maintained counter) then his Linux service's password can be generated as "11Novell11." The rules for achieving this Linux service's user identification and password are constrained by the Linux service's access service policies and rules and are known only to the processing of the method 100. Thus, the mapping between Bill's master credential and the service credential can be dynamically and logically reproduced, at 140, when needed and does not need stored in any data store with some embodiments of this invention.

In other embodiments, the service credentials are randomly generated. The values of these service credentials conform to each service's access service policies and rules. In these embodiments, the randomly generated service credentials are maintained in storage in either a single or a plurality of storage locations or data stores.

The teachings of this invention permit a single requestor to create a single requestor identifier and password (master credential), and have that single identifier and password mapped to a plurality of other services that can have different requirements or different identifiers and passwords (service credentials). This is beneficial because the master credential is only transmitted between the requestor and the processing of the method 100. In this way, a single requestor does not expose its master credentials to the services with which the requestor interacts, since each separate service has different service credentials that are known only to the processing of the method 100.

Essentially, a single requestor is known to a plurality of services via different alias identifications and passwords. As far as these services are concerned the requestor is properly authenticated through the aliased service credentials. Yet, the requestor is unaware of the specific aliased service credentials and does not need to manage them individual or be concerned when one or more are changed due to password expirations and the like. Furthermore, a malicious user on one of the services cannot penetrate any of the requestor's other services, since at no point was anything but a single service credential provided to the service. Thus, the master credential remains secure, and each of the other services' credentials remains secure from each of the remaining services.

In still other embodiments of the invention, a requestor can self manage or partially manage its own service credentials which are synchronized each time such a change is made in the processing of the method 100 with the affected services. In these situations, a feature can be added to provide a requestor service credentialing values that can be changed or altered by the requestor and synchronized with the affected services and the requestor's master credential.

In still other embodiments, if an administrator on one of the services being used by a requestor alters a requestor's service credentials then these changes can be synchronized back to the processing of the method 100 without knowledge or intervention being required by the affected requestor. In these situations, the individual services are slightly modified to send changes to the processing of the method 100. However, in the other embodiments of this invention, no changes are needed to services used with the teachings of this invention.

Figure 2:
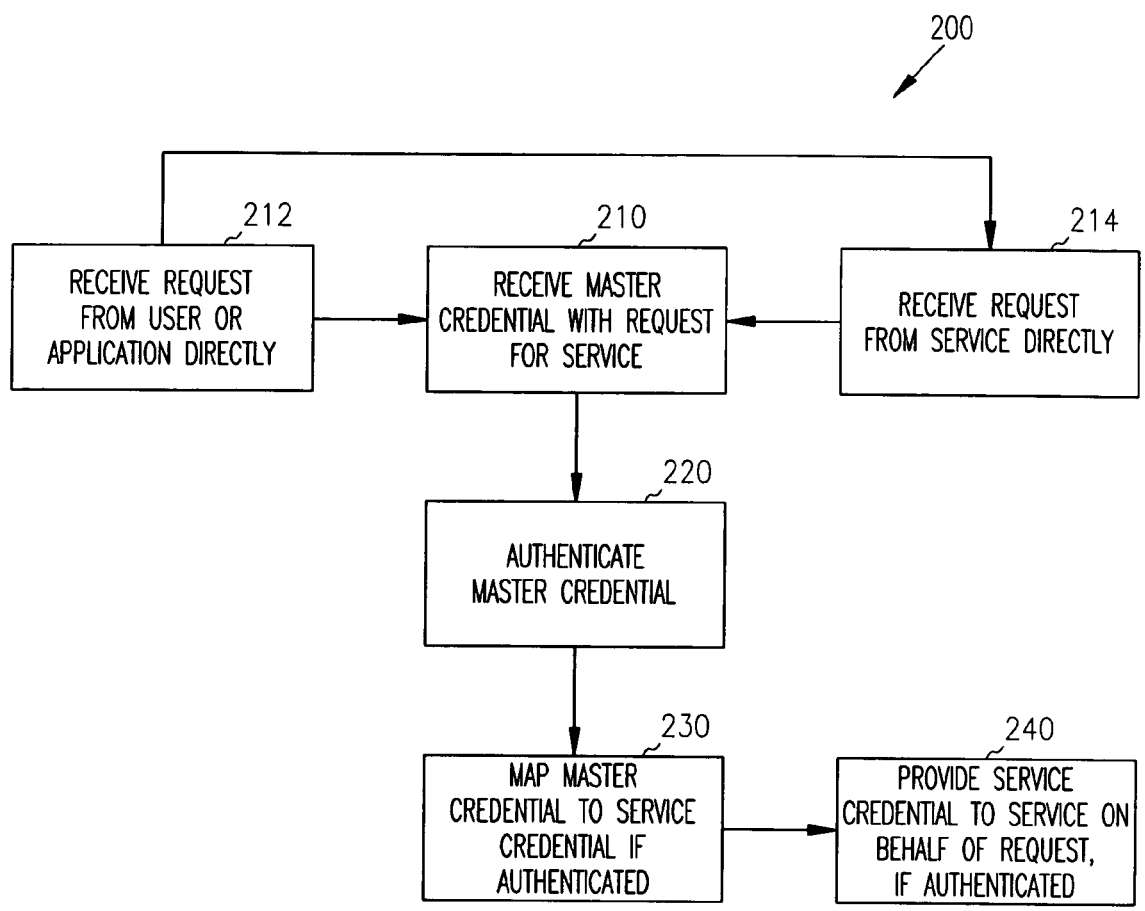
FIG. 2 is a flowchart representing another method for mapping credentials.

FIG. 2 is another method 200 for mapping credentials. The method 200 is implemented as one or more services residing in a computer-readable medium. The embodiment of the method 200 is used after a requestor has used the method 100 in order to create a master credential and one or more service credentials for services (initialization).

Accordingly, at 210, a requestor (e.g., user or electronic application) makes a request for a service. This request can include the master credential for the requestor or can be used by the processing of the method 200 in order to automatically acquire the requestor's master credential. The request also identifies the service that can satisfy the request. The identity of the needed service can be identified in a variety of ways with the request (e.g., service IP address).

The request itself can originate directly from a requestor at 212. Alternatively, the request can originate directly from the service that the request identifies at 214. In this latter case, this can be done in a variety of ways such as pre-configuring the service to redirect all initial sign-on or authentication requests that originate from a specific IP address or are received on a specific port address to the processing of the method 200.

Once the request is directly received from the requestor or indirectly received from the requestor via the desired service and the master credential obtained, the master credential is authenticated at 220. If the master credential is not authenticated then no credential mapping occurs and a notice is sent to the requestor (not shown in FIG. 2).

If the master credential is authenticated, then, at 230, the master credential is mapped to a service credential for the desired service. Again, as was discussed in detail with the method 100, this mapping can be achieved in a variety of manners, such as by using the requestor identification of the master credential and the service identification to search one or more credentialing data stores or by reproducing the service credential based on processing known only to the method 200. The result of obtaining the mapping is the needed service credential required for servicing the request.

After the needed service credential is obtained, at 240, the service credential is provided by proxy to the service on behalf of the original requestor. As far as the service is concerned the request appears to have originated from the requestor, and the request is then authenticated using the provided service credential. The master credential is not sent by the processing of the method 200 to the service, only the internally maintained service credential and the initial request made by the requestor are sent to the service. Moreover, the service credential provided on behalf of the requestor is unique and specific to the desired service identified in the initial request. Thus, no malicious users can obtain access to the requestor's master credentials or other service credentials associated with other services.

The desired service can be a trusted service or non trusted service known to the processing of the method 200 or the requestor. The processing of the method 200 serves as a credentialing proxy and credentialing management service for the requestor. In this way, the requestor need not individually manage disparate service credentials and does not expose master credentials or other service credentials to services not related to the initial request. These techniques provide a more secure collaboration environment for departments within an organization or between disparate organizations. Additionally, these techniques permit easier maintenance and ease of use for requestor's, since logically the requestor maintains and is aware of a single master credential.

Figure 3:
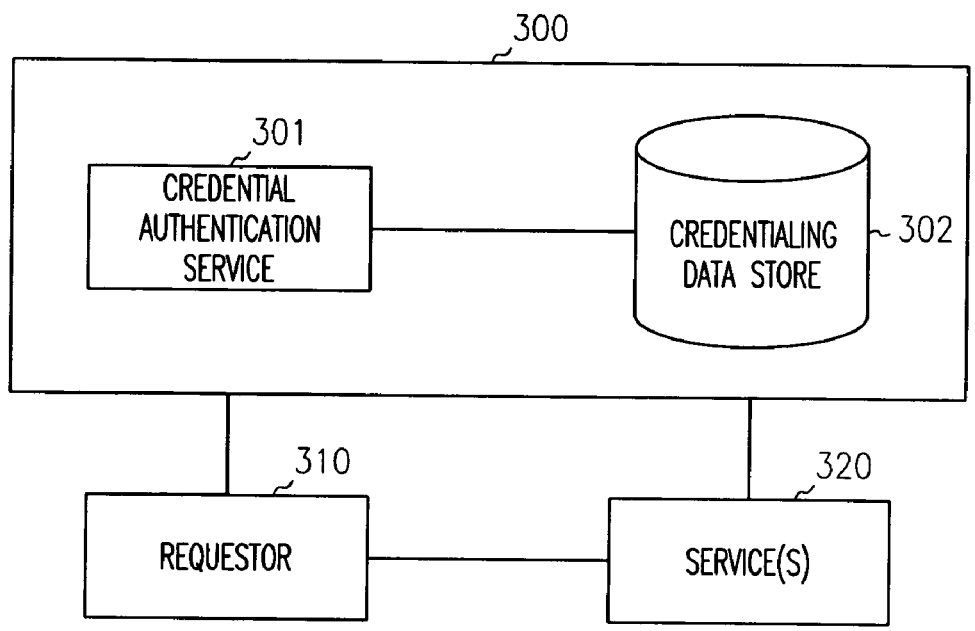
FIG. 3 is a diagram of a credential mapping system, according to one.

FIG. 3 is a diagram for a credential mapping system 300. The credential mapping system 300 is implemented in a computer-readable medium and is accessible over a network. Moreover, in one embodiment, the credential mapping system 300 implements the processing described in methods 100 and 200 above with FIGS. 1 and 2. The credential mapping system 300 includes a credential authentication service 301 and a credentialing data store 302.

The credential authentication service 301 accesses the credentialing data store 302 to generate and authenticate master credentials for requestors (e.g., users and electronic applications).

In those situations where the credential authentication service 301 generates a master credential on behalf of a requestor 310, this can be achieved by acquiring from the requestor 310 a requestor identification and additional information, such as a password, digital certificate, or digital signature. The master credential is then created for the requestor 310 and stored in the credentialing data store 302 (indexed on the requestor identification).

Next, either the requestor 301 or a network administrator identifies the service(s) 320 for which the requestor 301 can access with the credential mapping system 300. These ervice(s) 320 are uniquely identified (e.g., IP address) and indexed with the requestor identification into the credentialing data store 302. After this initialization process, the credential mapping system 300 is ready to map credentials to the service(s) 320 on behalf of the requestor 310.

At some point during operation, the credential mapping system 300 receives a request for the service 320 from a requestor 310 or indirectly from the service 320 (when the service 320 is configured to redirect requests to the credential mapping system 300). The request can include the requestor's master credentials. Alternatively, the credential mapping system 300 can be configured to acquire either manually or automatically the master credential from the requestor 310 or the requestor's computing environment.

Once the credential mapping system 300 has the request for the service 320 and has acquired the master credential of the requestor 310, the credential mapping system 300 attempts to authenticate the master credential against the credentialing data store 302. The can be done in a number of manners, such as indexing the requestor's acquired identification into the credentialing data store 302 and checking the requestor's password (or digital certificate or signature) against the appropriate field contents of the credentialing data store 302. If the obtained requestor identification does not exist in the credentialing data store 302 or if the obtained requestor's password does not match the appropriate field contents of the credentialing data store 302, then the request is not authenticated and a notice is sent to the requestor 302.

If the credential mapping system 300 does successfully authenticate the master credential, then the credentialing data store 302 is accessed to obtain the service credential that the service 320 needs to authenticate the requestor 310. Thus, the credentialing data store 302 serves as the mapping between the master credential and the appropriate service credential. Next, the credential mapping system 300 provides via proxy the initial received request and the service credential to the service 320 on behalf of the requestor 310.

The service 320 then authenticates the requestor 320 and the request using the service credential and grants access to the requestor 320. The service 320 then proceeds to service the request that was initially issued by the requestor 320.

In some embodiments, the credential mapping system 300 also includes a reporting service (not shown in FIG. 3) which monitors and retains log information relating to requestors 320 and requests being issued. This log information can be beneficially assembled into reports and periodically issued to interested parties. Additionally, log information can be used to define alert circumstances where administrators are notified when requests appear to be related to events that are prohibited or potentially harmful to an organization.

In more embodiments, the credential authentication service 301 can be configured to manually accept changes to service credentials from an administrator or a requestor 310. In these situations, the credential authentication service 301 updates and keeps in synchronization the mappings of the master credential within the credentialing data store 302 and makes the appropriate changes with the affected service(s) 320. In other embodiments, the service(s) 320 are modified to send alert notifications when service credentials are directly modified on the service(s) 320. Again, the credential authentication service 301 maintains these updates in the credentialing data store 302.

Figure 4:
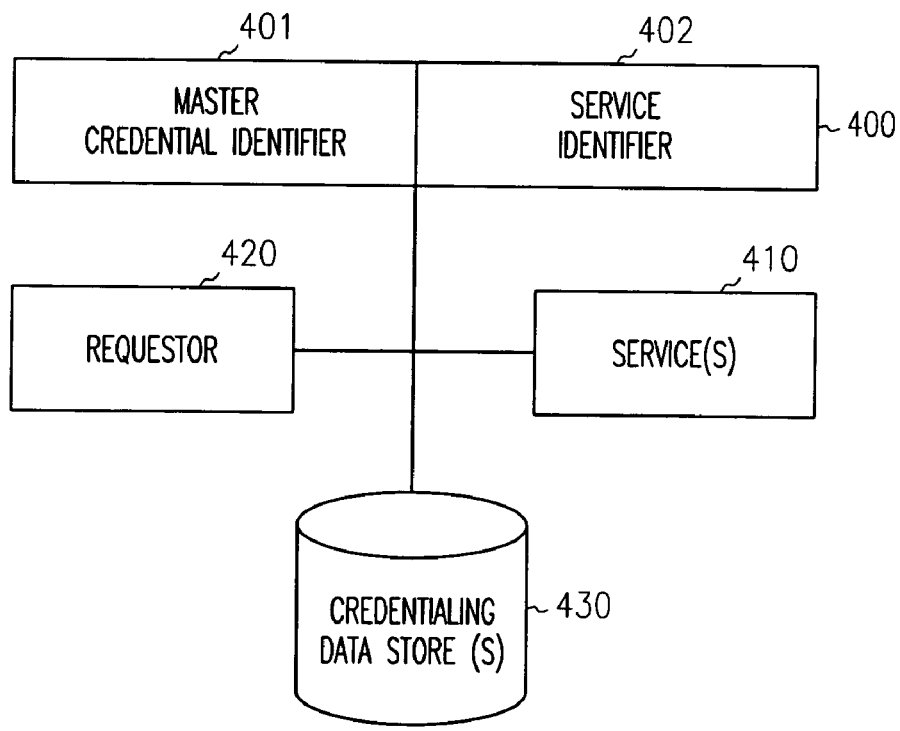
FIG. 4 is a diagram of credential mapping data structure, according to one embodiment of the invention.

FIG. 4 is a diagram of a credential mapping data structure 400. The credentialing mapping data structure 400 resides in and is accessible from a computer-readable medium. The credentialing mapping data structure 400 can be dynamically assembled from a request for a service 410 made by a requestor 420. Alternatively, the credentialing mapping data structure 400 can be pre-fabricated and stored in a credentialing data store 430. The methods 100 and 200 and the system 300 consume and use the credentialing mapping data structure 400 in order to map a master credential to one or more service credentials on behalf of a requestor 420.

The credentialing mapping data structure 400 includes a master credential identifier 401 and a service identifier 402. The master credential identifier 401 is a portion of the master credential such as the requestor identifier. The service identifier 402 is a unique identifier for a service 410. Both the master credential identifier 401 and the service identifier 402 can be obtained or derived from a request issued for a service 410 by a requestor 420.

Moreover, upon initialization of the credentialing data store 410, records or mappings of master credentials to service credentials are formed based on values for requestor identifiers 401 and service identifiers 402. These mappings also include values for passwords (or digital certificates or digital signatures) associated with the master credential and one or more service credentials for each service 410. The service credentials are initially generated and provided in the mappings by using access service policies and rules associated with the appropriate services 410.

The master credential identifier 401 and the service identifier 402 are used as keys into the credentialing data store 430 in order to obtain the mappings when needed to satisfy a request issued by a requestor 420. In this way, the credentialing mapping data structure 400 is used to structure the credentialing data structure 430, and used with requests received from a requestor 420 that are made for gaining access to a service 410.

When a requestor 420 makes a request for a service 410, the request can include the credentialing mapping data structure 400. That request is intercepted by a service or system, such as the ones discussed in FIGS. 1-3, and the credentialing mapping data structure 400 is stripped out and used as keys to search the credentialing data store 430. The results of that search, if successful, provide additional master credential information (password, digital certificate, or digital signature) which can then be authenticated. If authentication is achieved successfully, then the proper service credential is obtained and sent (via proxy) to the service 410 on behalf of the requestor 420 along with the initially provided request.

In one embodiment, the request is a WWW link embodied in a URL data structure that is accessed via a browser by the requestor 420. Moreover, the service(s) 410 are either trusted or not trusted to the requestor 420 or the services or systems acting as a proxy on behalf of the requestor 420.

The credentialing mapping data structure 400 provides the foundation for mapping (federating) credentials between services 410, in such a manner that master credentials of a requestor 420 are not exposed and service credentials of services 410 not related to a specific request are not exposed. Furthermore, the credentialing mapping data structure 400 permits a user to delegate credential management to other services or systems, such as those described in FIGS. 1-3. Lastly, the credentialing mapping data structure 400 permits organizations to automatically and programmatically maintain and support their credentials and business collaborations.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate embodiment.

What is claimed is:

1. An apparatus for mapping credentials, comprising:
a processor configured to:
create a master credential that is used to identify and to authenticate a requestor in an electronic environment, the master credential is later acquired from a browser cookie and the master credential initially authenticates the requestor;
generate a new service credential for a service, and wherein the service credential is used to authenticate the requestor via an alias for the requestor for access to the service according to rules defined by the service and the service credential is different from the master credential and includes the alias to prevent the service from discovering the master credential, and the new service credential is generated by the method interacting with the service using the rules to establish the new service credential with that service for the alias;
generate a mapping from the master credential to the service credential thereby permitting the mapping to be used to acquire the service credential from the master credential when the requestor attempts to access the service and the service credential identifies and authenticates the requestor via the alias to the service according to the rules defined by the service, and the master credential is only transmitted between the requestor and the method, and in a first configuration the service credential is generated in a manner that permits the service credential to be dynamically reconstituted when requested; and
synchronize, in a second configuration, changes made to the service credential by an administrator of the service without knowledge or intervention being required by the requestor, the second configuration occurring when the first configuration is not present.

2. The apparatus of claim 1 further comprising, pushing the service credential to the service when a request for the service is made if the request is authenticated by the master credential.

3. The apparatus of claim 1 further comprising, pulling the service credential by the service when needed by the service, if a request for the service is made and if the request is authenticated by the master credential.

4. The apparatus of claim 1 wherein the creating further includes, identifying the master credential as an identification and password associated with at least one of a user and an application.

5. The apparatus of claim 1 wherein the generating of the service credential further includes, using access service policies and the rules defined by the service in order to generate the service credential.

6. The apparatus of claim 5 wherein the generating of the service credential further includes, randomly generating the service credential.

7. A method for mapping credentials implemented in a computer-readable medium and adapted to be processed by a computer, comprising:
receiving, by a computer, a master credential with a request to access a service the request is associated with a requestor that is attempting to access the service, and the master credential is only transmitted between the requestor and the method;
authenticating, by the computer, the master credential and thereby authenticating and identifying the requestor;
mapping, by the computer, the master credential to a new service credential, when the master credential is authenticated, and the service credential is subsequently acquired from the mapping in response to access to the master credential and the service credential authenticates the requestor via an alias for access to the service according to syntactic and semantic rules defined by the service, and the service credential was previously acquired by the method interacting with the service using the syntactic and semantic rules to establish the alias;
providing, by the computer, the service credential via the mapping to the service, when the master credential is authenticated for purposes of authenticating the requestor for access to the service, the requestor is authenticated for access as the alias and the service cannot discover the master credential;
subsequently altering the service credential by an administrator of the service; and
synchronizing, by the computer, the changes to the service credential with the mapping, and the synchronization of the changes occurring without knowledge or intervention being required by the requestor.

8. The method of claim 7 wherein the receiving further includes, receiving the request directly from at least one of a user and an application associated with the master credential.

9. The method of claim 7 wherein the receiving further includes, receiving the request directly from the service on behalf of at least one of a user and an application associated with the master credential.

10. The method of claim 9 wherein the receiving further includes, redirecting, by the service, the request when the service receives the request.

11. The method of claim 7 wherein the receiving further includes, receiving at least a portion of the master credential and the request as a Uniform Resource Locator (URL) data structure.

12. The method of claim 7 wherein the receiving further includes, receiving the request wherein the request is made to access the service, and the service is at least one of a trusted and non trusted World-Wide Web (WWW) service.

* * * * *